(12) United States Patent
Matsumoto (10) Patent No.: US 10,348,977 B2
(45) Date of Patent: Jul. 9, 2019

(54) IMAGE PICKUP APPARATUS CALCULATING LIGHT-AMOUNT VARIATION CHARACTERISTIC OF LIGHT FROM OBJECT, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yukihiro Matsumoto, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 15/632,995

(22) Filed: Jun. 26, 2017

(65) Prior Publication Data

US 2018/0007249 A1  Jan. 4, 2018

(30) Foreign Application Priority Data

Jun. 29, 2016 (JP) ................................. 2016-128604

(51) Int. Cl.
| | |
|---|---|
| *H04N 5/235* | (2006.01) |
| *G06K 9/62* | (2006.01) |
| *H04N 5/376* | (2011.01) |
| *H04N 5/378* | (2011.01) |
| *H04N 9/04* | (2006.01) |

(52) U.S. Cl.
CPC ......... *H04N 5/2357* (2013.01); *G06K 9/6215* (2013.01); *H04N 5/2353* (2013.01); *H04N 5/378* (2013.01); *H04N 5/3765* (2013.01); *H04N 9/04* (2013.01)

(58) Field of Classification Search
CPC ...... G06K 9/6215; H04N 5/2353; H04N 9/04; H04N 5/3765; H04N 5/378; H04N 5/2357
See application file for complete search history.

(56) References Cited

U.S. PATENT DOCUMENTS

2006/0262211 A1* 11/2006 Kido ................. H04N 5/23245
                                                                    348/308

FOREIGN PATENT DOCUMENTS

JP          2016-015615 A     1/2016

* cited by examiner

*Primary Examiner* — James M Hannett
(74) *Attorney, Agent, or Firm* — Carter, DeLuca & Farrell LLP (57) ABSTRACT

An image pickup apparatus capable of improving accuracy of calculation of a light-amount variation characteristic of light from an object when displaying a through image. A control unit picks up a first image with an image pickup device according to an image pickup condition changed when the image pickup condition is changed from a predetermined condition while displaying the through image, picks up a second image with the image pickup device within a first accumulation period without reflecting the image pickup condition changed, and picks up a third image with the image pickup device within a second accumulation period shorter than the first accumulation period without reflecting the image pickup condition changed. A display control unit displays the first image on a display unit as the through image. A calculation unit calculates the light-amount variation characteristic of light from an object based on the second and third images.

11 Claims, 7 Drawing Sheets

IMAGE PICKUP APPARATUS CALCULATING LIGHT-AMOUNT VARIATION CHARACTERISTIC OF LIGHT FROM OBJECT, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus, a control method therefor, and a storage medium storing a control program therefor, and in particular, relates to calculation control of a light-amount variation characteristic of light from an object in an image pickup apparatus, such as a digital camera.

Description of the Related Art

Generally an image pickup apparatus, such as a digital camera, has what is called a live view function that displays an image obtained with an image pickup device before picking up an image on a display unit for a composition check etc. Hereinafter, an image that is not subjected to recording and is displayed on a display unit with the live view function is referred to as a through image. However, when the live view function is used under a light source of which a light amount varies cyclically at a cycle corresponding to a commercial power frequency (hereinafter such a light source is referred to as a flickering light source), the light amount variation of the flickering light source may affect a through image. For example, horizontal stripes called a line flicker may occur in a through image, or a cyclic flicker called a screen flicker may occur between a plurality of continuous through images.

Since the light amount variation of such a flickering light source affects not only a through image but also a static image for recording, it is preferable to adjust image pickup conditions by calculating the light amount variation of the flickering light source, i.e., a light-amount variation characteristic of light from an object that is irradiated by the flickering light source. Hereinafter, the cyclic light amount variation of light from an object is referred to as a flicker, a process to calculate the light-amount variation characteristic of light from an object is referred to as a flicker detection, and a variation cycle of light from an object that varies at a specific cycle is referred to as a flicker cycle.

The following technique is proposed in Japanese Laid-Open Patent Publication (Kokai) No. 2016-15615 (JP 2016-15615A). That is, first flicker information is obtained by detecting a frequency and a phase of a flicker on the basis of a through image. It is determined whether the first flicker information is valid at a time of image pickup. When the first flicker information is invalid, second flicker information is obtained using a sensor other than an image pickup device. Then, an exposure timing is controlled according to the second flicker information.

However, the technique disclosed in the above-mentioned publication detects a flicker using the other sensor when the first flicker information that is obtained on the basis of the through image obtained with the image pickup device is invalid. That is, the technique merely selects a suitable flicker detection result from among the plurality of flicker detection results, and accordingly, it is difficult to improve accuracy of the flicker detection at the time of displaying the through image.

SUMMARY OF THE INVENTION

The present invention provides an image pickup apparatus, a control method therefor, and a storage medium storing a control program therefor, which are capable of improving accuracy of calculation of the light-amount variation characteristic of light from an object at the time of displaying the through image.

Accordingly, a first aspect of the present invention provides an image pickup apparatus include an image pickup device, a display unit configured to display an image obtained by picking up with the image pickup device as a through image, a control unit configured to pick up a first image with the image pickup device according to an image pickup condition changed when the image pickup condition is changed from a predetermined condition while displaying the through image, to pick up a second image with the image pickup device within a first accumulation period without reflecting the image pickup condition changed, and to pick up a third image with the image pickup device within a second accumulation period shorter than the first accumulation period without reflecting the image pickup condition changed, a display control unit configured to display the first image on the display unit as the through image, and a calculation unit configured to calculate a light-amount variation characteristic of light from an object based on the second image and the third image.

Accordingly, a second aspect of the present invention provides A control method for an image pickup apparatus, the control method including a step of displaying an image obtained by picking up with an image pickup device as a through image, a step of picking up a first image with the image pickup device according to an image pickup condition changed when the image pickup condition is changed from a predetermined condition while displaying the through image, a step of picking up a second image with the image pickup device within a first accumulation period without reflecting the image pickup condition changed, a step of picking up a third image with the image pickup device within a second accumulation period shorter than the first accumulation period without reflecting the image pickup condition changed, a display control step of displaying the first image on the display unit as the through image, and a calculation step of calculating a light-amount variation characteristic of light from an object based on the second image and the third image.

Accordingly, a third aspect of the present invention provides a non-transitory computer-readable storage medium storing a control program causing a computer to execute the control method of the second aspect.

According to the present invention, the accuracy of calculation of the light-amount variation characteristic of light from an object at the time of displaying the through image is improved.

Further features of the present invention will become apparent from the following description of exemplary embodiments with reference to the attached drawings.

DESCRIPTION OF THE EMBODIMENTS

Hereafter, image pickup apparatuses according to embodiments of the present invention will be described in detail with reference to the drawings.

In the following description, a method (hereinafter referred to as a flicker detection method) of calculating a light-amount variation characteristic of light from an object according to the present invention will be first described in order to facilitate understanding of image pickup apparatuses according to the embodiments of the present invention.

Figure 1:
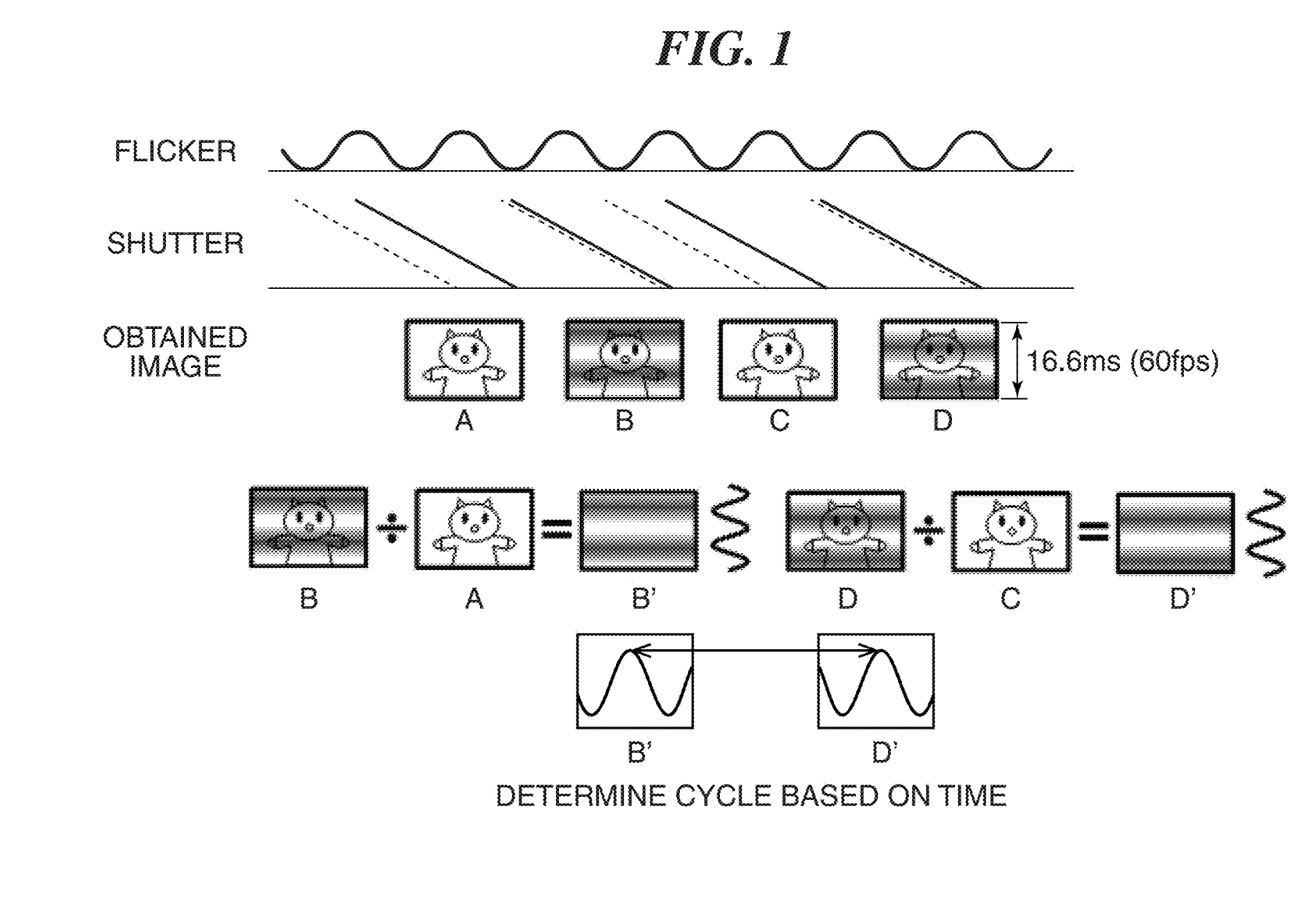
FIG. 1 is a view for describing a basic principle of a flicker detection method used by image pickup apparatuses according to embodiments of the present invention.

FIG. 1 is a view for describing a basic principle of the flicker detection method used by the image pickup apparatuses according to the embodiments of the present invention.

As shown by a graph on a first stage in FIG. 1, a flicker shall occur at a cycle of $1/120$ seconds, for example. A through image is obtained by accumulating electric charge with an image pickup device in an accumulation period (i.e., an accumulation period shorter than the flicker cycle of $1/120$ seconds) that is affected by the flicker. It should be noted that the accumulation period of the image pickup device is controlled by what is called an electronic shutter. In a chart on a second stage in FIG. 1, a broken line indicates an accumulation start timing and a solid line indicates an accumulation end timing. Thus, images B and D obtained in the short accumulation period are called flicker emphasis images. In order to obtain the flicker emphasis image, it is necessary to take into consideration not only the length of the accumulation period of each line of the image pickup device but an accumulation timing. For example, even if the accumulation period of each line of the image pickup device is shorter than a flicker cycle, if the accumulation timing of all the lines is simultaneous, light and darkness will not arise in an image. Accordingly, the accumulation start timings are controlled so that the accumulation timings of the lines of the image pickup device shift (the accumulations of the lines start in order). In FIG. 1, the accumulation start timings of the first line and the last line are shifted by 16.6 ms so that the obtained image includes at least one cycle of light and darkness. As long as at least one cycles of light and darkness is included in the obtained image, the shift of the accumulation start timings is not limited to 16.6 ms.

Furthermore, an image is obtained by accumulating electric charge with the image pickup device in a long accumulation period (for example, an accumulation period longer than $1/100$ seconds) that reduces the effect of the flicker. The images A and C obtained in this way are called flicker reduction images.

Subsequently, differential images B' and D' are obtained by differentiating the flicker emphasis images by the flicker reduction images. In these differential images B' and D', difference in the light amount variation (i.e., flicker component only) remains. Then, a pair of flicker waveforms are generated by mapping these differential images B' and D', and presence of a flicker and a flicker cycle are detected on the basis of these flicker waveforms.

As mentioned later, the flicker reduction images A and C are displayed on a display unit as through images.

Figure 2A:
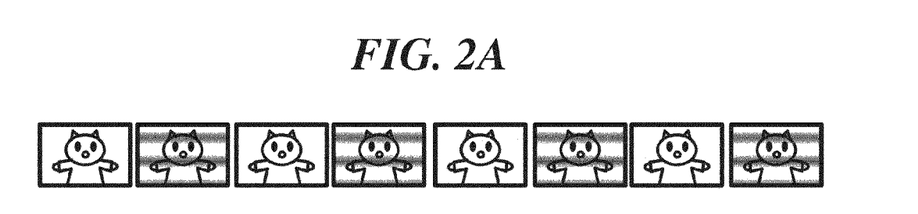
FIG. 2A and FIG. 2B are views for describing examples of images to which exposure correction is applied.
Figure 2B:
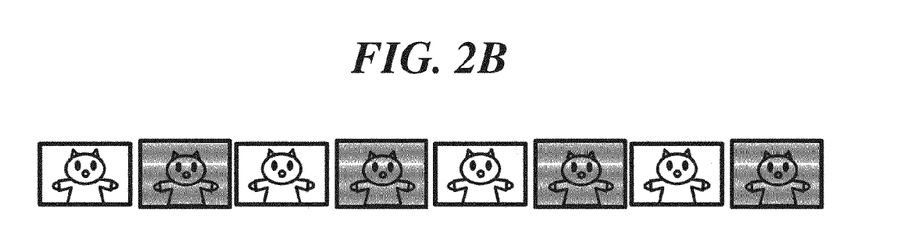

FIG. 2A and FIG. 2B are views for describing examples of images to which exposure correction is applied. In each view, odd-numbered images counted from left side are the flicker reduction images and even-numbered images are the flicker emphasis images. Then, FIG. 2A shows the flicker reduction images of which exposures are corrected and the flicker emphasis images of which exposures are not corrected. Moreover, FIG. 2B shows the flicker reduction images and flicker emphasis images of which exposures are corrected.

As mentioned above, when the flicker reduction image is displayed as the through image, the exposure of the flicker reduction image is corrected as shown in FIG. 2A. In this case, if the exposure of the flicker emphasis image is not corrected, the differential image of the flicker reduction image and flicker emphasis image does not indicate the flicker component correctly, which makes it difficult to detect presence of a flicker and a flicker cycle accurately.

On the other hand, when the exposures of both the flicker reduction image and the flicker emphasis image are corrected as shown in FIG. 2B, the amplitude of the flicker component that the differential image of the flicker reduction image and flicker emphasis image expresses becomes small. As a result, it becomes difficult to detect presence of a flicker and a flicker cycle accurately. Accordingly, the embodiments that improve the accuracy of the flicker detection at the time of displaying the through image even if the exposure is corrected will be described hereinafter.

Figure 3:
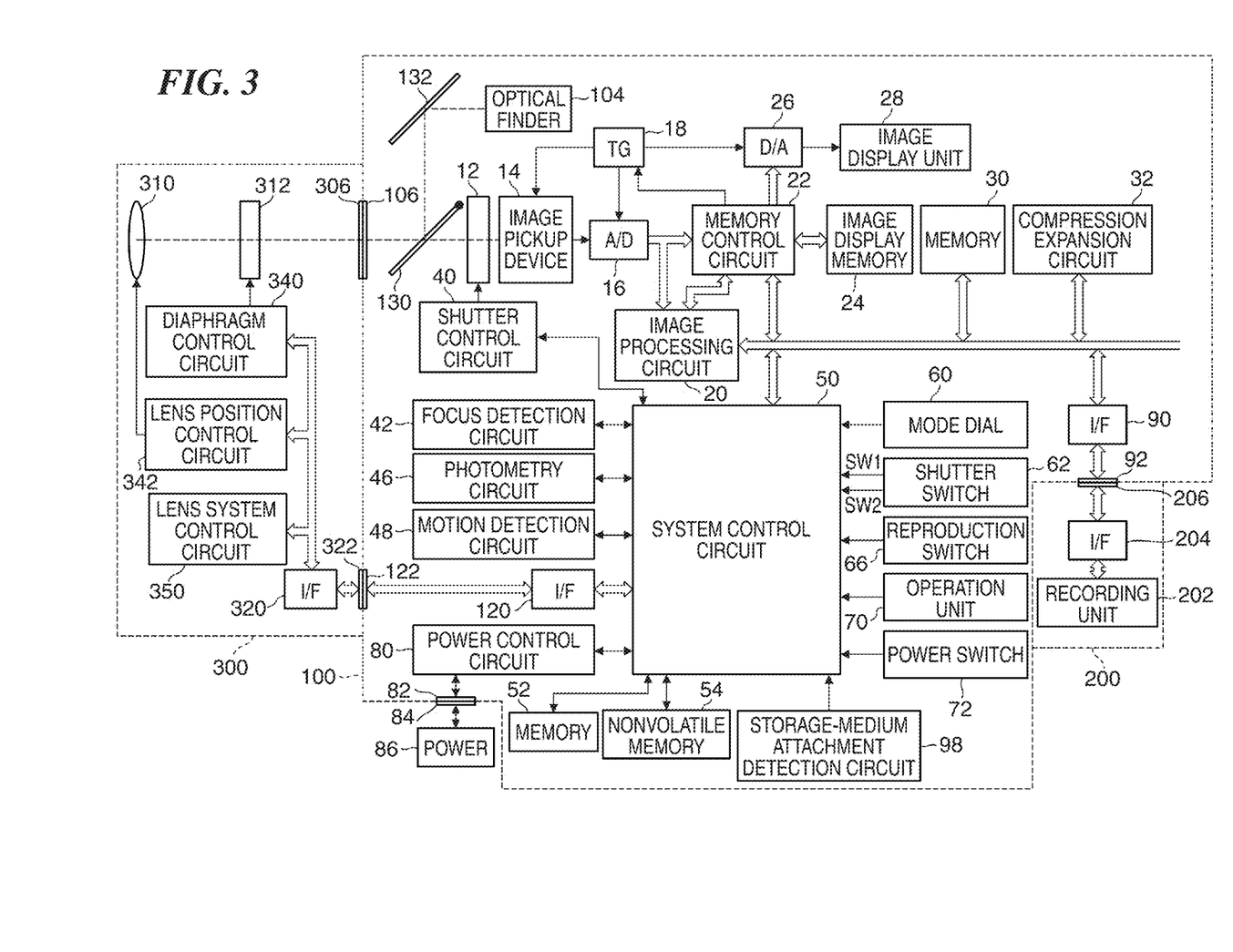
FIG. 3 is a block diagram schematically showing a configuration of the image pickup apparatus (camera) according to a first embodiment of the present invention.

FIG. 3 is a block diagram schematically showing a configuration of the image pickup apparatus according to a first embodiment of the present invention.

The illustrated image pickup apparatus is what is called a single lens reflex digital camera (hereinafter referred to as a camera, simply) of which an image pickup lens unit is exchangeable, for example. It should be noted that the present invention is applicable not only to a digital camera but to a camera mounted on an electronic apparatus (for example, a cellular phone).

The image pickup lens unit (hereinafter referred to as a lens unit) 300 has a lens 310 and a diaphragm 312, and is attached to a camera body 100 by engaging lens mounts 306 and 106. Furthermore, the lens unit 300 has a diaphragm control circuit 340, lens position control circuit 342, and lens system control circuit 350. These diaphragm control circuits 340, lens position control circuit 342, and lens system control circuit 350 are connected to a system control circuit 50 in the camera body 100 through an interface (I/F) 320, connectors 322 and 122, and an interface (I/F) 120.

Although the connector 122 of the camera body 100 is provided in the lens mount 106 and the connector 322 of the lens unit 300 is provided in the lens mount 306, they are illustrated at the separate positions in FIG. 3 for convenience of illustration. The camera body 100 and the lens unit 300 communicate control signals, camera state signals, data signals, etc. mutually through the connectors 122 and 322. The connectors 122 and 322 is used also in order to supply electric currents of various voltages. Furthermore, the connectors 122 and 322 may enable not only electrical communications but optical communications, voice communications, etc.

The camera body 100 is provided with a mirror 130, a shutter 12, and an image pickup device 14. In the description, the image pickup device 14 is a CMOS image sensor, for example. The shutter 12 adjusts an exposure amount of the image pickup device 14. Light from the lens unit 300 forms an optical image on the image pickup device 14 via the mirror 130 and the shutter 12. The image pickup device 14 outputs an electrical signal (analog signal) corresponding to the optical image.

An A/D converter 16 converts the analog signal output from the image pickup device 14 into a digital signal (image data). A timing generator (TG) 18 sends a clock signal and a control signal to the image pickup device 14, the A/D converter 16, and a D/A converter 26 under control of the system control circuit 50. The system control circuit 50 controls accumulation of electric charge (what is called an electronic shutter) by controlling a reset timing of accumulated charge of the image pickup device 14 with the TG 18.

An image processing circuit 20 applies predetermined image processes, such as a pixel interpolation process and a color conversion process, to the image data sent from the A/D converter 16, or image data sent from a memory control circuit 22. Furthermore, the image processing circuit 20 performs distance measuring and photometry using the image data obtained as a result of the image pickup.

The distance measuring using the image data obtained by the image pickup is performed on the basis of contrast of the image data. However, the distance measuring may be performed on the basis of not only the contrast but phase difference detected on the image pickup surface, for example.

Furthermore, the image processing circuit 20 performs a predetermined arithmetic process using the image data obtained as a result of the image pickup, performs photometry of a TTL system and an AWB (automatic white balance) process, detects a face of an object, and detects a motion of an object, on the basis of a result of the arithmetic process concerned.

When a face is detected, presence of a face, a face orientation and a face size are detected in image data. When a motion of an object is detected, a moving amount and moving direction of an object are detected using a plurality of image data (i.e., frames). Furthermore, moving speed is detected on the basis of an image pickup interval of the plurality of image data concerned and the moving amount of the object.

The illustrated camera body 100 is provided with a focus detection circuit 42 and a photometry circuit 46. The system control circuit 50 may perform the distance measuring and photometry using the focus detection circuit 42 and the photometry circuit 46 instead of performing the distance measuring and photometry by the image processing circuit 20.

The memory control circuit 22 controls the A/D converter 16, the image processing circuit 20, and a compression expansion circuit 32, and writes its output data into an image display memory 24 or a memory 30. Image data is written into the image display memory 24 as display image data. The memory control circuit 22 displays the display image data written into the image display memory 24 as an image on an image display unit 28, such as an LCD or an organic electroluminescence display, through the D/A converter 26.

When the through image is displayed by the live view function, the system control circuit 50 successively performs the image pickup (charge accumulation) with the image pickup device 14 and reading of the image data obtained by the image pickup at a predetermined cycle (frame rate). Then, the image data concerned is successively displayed on the image display unit 28 as the through image through the memory control circuit 22 and D/A converter 26 according to instructions from the system control circuit 50.

It should be noted that camera information indicating a state of the camera is displayed on the image display unit 28 under control of the system control circuit 50. For example, a selection of single-shot/continuous-shot, a delayed action, a compressibility, the number of recording pixels, the number of recorded images, the residual number of recordable images, shutter speed, and an aperture value are displayed as the camera information. Furthermore, an exposure correction setting, a flash setting, a red-eye reduction setting, a macro pickup setting, a buzzer setting, a clock battery residual, a main battery residual, and an error message are displayed as the camera information. Moreover, information in two or more digits, an attachment state of the storage medium 200, an attachment state of the lens unit 300, a communication I/F operating state, date and time, and a connection state to an external computer are displayed as the camera information.

The memory 30 is a storage unit that stores static images and video images obtained by image pickup, and is provided with a sufficient memory capacity for storing a predetermined number of static images and a predetermined time of video images. Moreover, the memory 30 is used also as a working area of the system control circuit 50.

The compression expansion circuit 32 reads the image data stored in the memory 30, and compresses the image data on the basis of a predetermined image compression method. Then, the compression expansion circuit 32 writes the compressed image data into the memory 30. Moreover, the compression expansion circuit 32 reads the compressed image data from the memory 30, expands the image data concerned, and writes the expanded image data into the memory 30.

A shutter control circuit 40 controls the shutter 12 under control of the system control circuit 50. It should be noted that shutter control circuit 40 cooperates with the diaphragm control circuit 340 which controls the diaphragm 312, and controls the shutter release 12.

The focus detection circuit 42 is used in an AF process. A part of light entering into the lens 310 forms an optical image on a focus sensor of the focus detection circuit 42 through the diaphragm 312, the mirror 130, and a sub mirror for focus detection (not shown) according to a single lens reflex system. Then, the focus detection circuit 42 detects the focusing state of the image formed as the optical image.

The photometry circuit 46 is used in an AE process. A part of light entering into the lens 310 forms an optical image on a photometry sensor of the photometry circuit 46 through the diaphragm 312, the mirrors 130 and 132, and a photometry lens (not shown) according to the single lens reflex system. Then, the photometry circuit 46 detects the exposure state of the image formed as the optical image.

A motion detection circuit 48 detects a motion of the camera, such as a moving direction and movement speed of the camera. The system control circuit 50 is a CPU, for example, and controls the entire camera by running programs stored in a memory 52. It should be noted that constants, variables, programs, etc., for operations of the system control circuit 50 are stored in the memory 52. A nonvolatile memory 54 is an EEPROM that is electrically recordable and erasable.

A mode dial 60, a shutter switch 62, a reproduction switch 66, and an operation unit 70 are connected to the system control circuit 50. These consist of a button, switch, dial, touch panel, sight-line detecting device, voice recognizing device, or a combination of them.

The mode dial 60 is a switch for setting one of a plurality of image pickup modes of the camera. The image pickup modes include an automatic pickup mode, a program pickup mode, a shutter speed priority pickup mode, an aperture priority pickup mode, and a manual pickup mode, for example. Furthermore, the pickup modes include a depth-of-focus priority (depth) pickup mode, portrait pickup mode, scenery pickup mode, close-up pickup mode, sport pickup mode, night-view pickup mode, and video capturing mode.

When a shutter button (not shown) provided in the camera is half-pressed (first stroke), the shutter switch 62 turns a first shutter switch signal SW1 ON. When the SW1 turns ON, the system control circuit 50 starts pickup-preparation processes, such as an AF process, AE process, AWB process, EF process, etc. A period during which the SW1 is ON and a second shutter switch signal SW2 mentioned later is OFF is defined as a pickup-preparation period.

When the shutter button is pressed fully (second stroke), the shutter switch 62 turns the second shutter switch signal the SW2 ON. When the SW2 turns ON, the system control circuit 50 instructs a series of image pickup sequences for performing an exposing process, a developing process, and a recording process.

In the exposing process, the system control circuit 50 writes the image signal read from the image pickup device 14 into the memory 30 as image data (RAW data) through the A/D converter 16 and the memory control circuit 22. Then, the system control circuit 50 develops the image data with the image processing circuit 20 and the memory control circuit 22 (the developing process), and writes the developed image data of the JPEG format etc. into the memory 30. Furthermore, the system control circuit 50 reads the post-development image data from the memory 30, and compresses it with the compression expansion circuit 32. After that, the system control circuit 50 writes the image data compressed into the storage medium 200 (the recording process).

The reproduction switch 66 is used to start a reproduction operation that reads the image data obtained by image pickup in the image pickup mode from the memory 30 or the storage medium 200 and displays it on the image display unit 28. The operation unit 70 is a man-machine interface equipped with a switch, button, rotation dial switch, touch panel, etc.

The operation unit 70 is provided with an exposure correction button, a menu button, a set button, setting buttons for an image recording mode, a compressibility, an image quality, and a flash, a drive mode changing button for single-shot/continuous-shot/delayed-action, for example. Furthermore, the operation unit 70 is provided with a menu movement + (plus) button and a menu movement – (minus) button.

The functions of the plus button and the minus button are also achievable by associating the rotative directions of the rotation dial switch with plus and minus. An exposure is changeable by operating the rotation dial switch while operating the exposure correction button. Furthermore, an exposure is changeable by operating the rotation dial switch during running of a predetermined timer. It should be noted that the menu may include a setting item for an exposure correcting amount. In such a case, an exposure is changeable by operations of the plus button and minus button or a touch operation while selecting the setting item for the exposure correcting amount in the menu.

The power switch 72 is used to switch ON and OFF of the power of the camera. The power switch 72 is able to switch ON and OFF of the powers of various attachments, such as the lens unit 300 and the storage medium 200, which are connected to the camera body 100.

The power control circuit 80 is provided with a battery detector, a DC-DC converter, a switching circuit that switches a block to which electric current is supplied, etc. The power control circuit 80 detects presence of the battery mounted, a battery type, and battery residual, and supplies required voltage to blocks including the storage medium 200 during a required period. A power 86 has a primary battery, such as an alkaline battery or a lithium battery, a secondary battery, such as a NiCd battery or a Li-ion battery, an AC/DC adaptor etc.

The storage medium 200, such as a memory card or a hard disk, has a connector 206, an I/F 204, and a recording unit 202, such as a semiconductor memory or a magnetic disk. When the connector 206 is connected to a connector 92, the storage medium 200 is attached to the camera body 100. A storage-medium attachment detection circuit 98 detects whether the storage medium 200 is attached to the camera body 100.

Although there is only one system including an I/F 90 and a connector 92 for connecting the storage medium 200 in the illustrated example, a plurality of systems including I/Fs and connectors may be provided. When the plurality of I/Fs and connectors are provided, I/Fs and connectors of mutually different standards may be provided.

When the I/F 90 and the connector 92 that are standardized are used, it is possible to exchange image data and management information attached thereto with peripheral devices, such as a computer and a printer, by connecting various kinds of communication cards.

A part of light entering into the lens 310 enters into an optical finder 104 through the diaphragm 312, the mirrors 130 and 132 according to the single lens reflex system. Then, a user can observe the optical image through the optical finder 104. As a result of this, the user is able to pick up an image only using the optical finder 104 without using an electronic view finder with the image display unit 28. It should be noted that the mirror 130 may be a quick return mirror or a half mirror.

The diaphragm control circuit 340 controls the diaphragm 312 on the basis of a photometry result under control of the system control circuit 50. The diaphragm control circuit 340 controls the diaphragm while cooperating with the shutter control circuit 40. The lens position control circuit 342 drives the lens 310 along an optical axis to adjust focus.

The lens system control circuit 350 controls the entire lens unit 300. The lens system control circuit 350 is provided with a CPU, volatile memory, and nonvolatile memory, for example. Constants, variables, program, etc., for operations are stored in the volatile memory. The nonvolatile memory stores identification information like a serial number inherent in the lens unit 300, management information, functional information including an open-aperture value, minimum aperture value, focal length, various setting values in the present and the past, etc.

Figure 4:
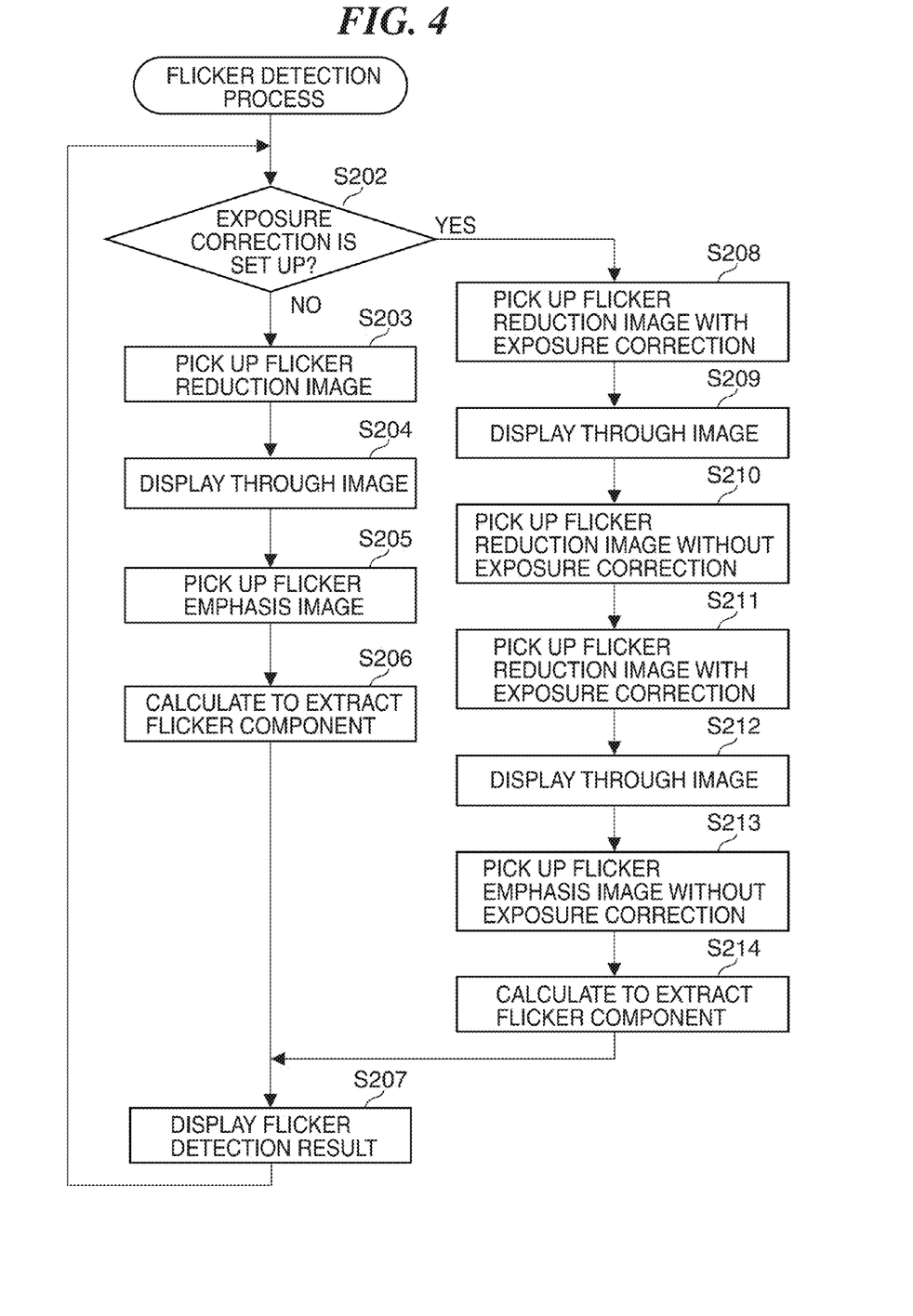
FIG. 4 is a flowchart showing a flicker detection process performed by the camera shown in FIG. 3.

FIG. 4 is a flowchart showing a flicker detection process performed by the camera shown in FIG. 3. It should be noted that the process concerning the illustrated flowchart is performed while displaying the through image.

When the power of the camera is turned ON by an operation of the power switch 72, the camera enters an image pickup ready state and displays a through image on the image display unit 28. While displaying the through image, the camera control circuit 50 determines whether the exposure correction for image pickup is set up by an operation of the operation unit 62 (step S202).

When the exposure correction is not set up (NO in the step S202), the system control circuit 50 picks up a flicker reduction image with the image pickup device 14 at a first image pickup timing, and records the obtained flicker reduction image into the memory 30 (step S203). Then, the system control circuit 50 displays the flicker reduction image concerned on the image display unit 28 as the through image (step S204).

At a second image pickup timing, the system control circuit 50 picks up a flicker emphasis image with the image pickup device 14 (step S205). Then, the system control circuit 50 applies a differentiation process to the flicker reduction image and flicker emphasis image that are recorded in the memory 30, extracts a flicker component, detects presence of a flicker and a cycle of the flicker, and makes them a flicker detection result (step S206). After that, the system control circuit 50 displays the flicker detection result on the image display unit 28 with the through image (step S207), and returns the process to the step S202.

It should be noted that the camera body 100 may be provided with another display device and may display only the flicker detection result on the display device concerned.

Figure 5:
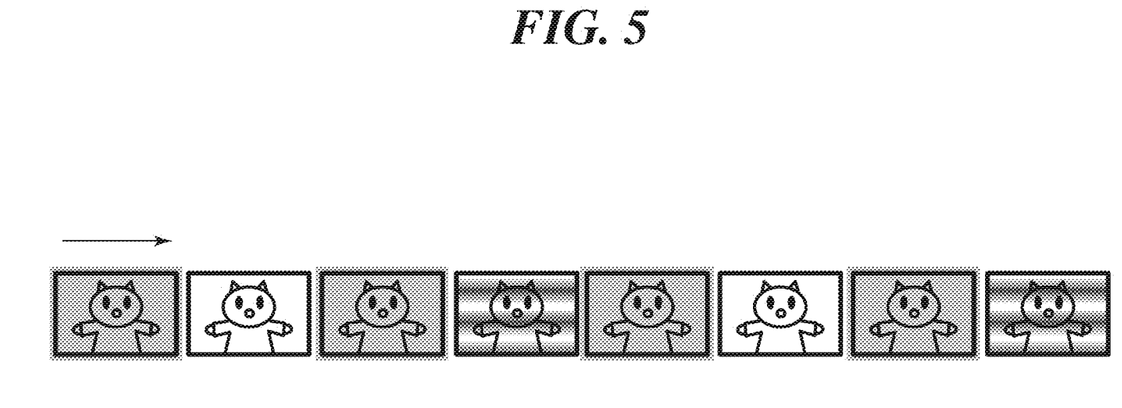
FIG. 5 is a view showing examples of a series of images picked up when it is determined that the exposure correction was set up in step S202 in FIG. 4.

FIG. 5 is a view showing examples of a series of images picked up when it is determined that the exposure correction was set up in the step S202 in FIG. 4. It should be noted that the images shall be picked up in the order shown by a solid line arrow in FIG. 5.

The process will be described with also reference to FIG. 5. When the exposure correction was set up (YES in the step S202), the system control circuit 50 picks up a flicker reduction image with the image pickup device 14 while performing exposure correction (step S208) at the first image pickup timing. Hereinafter, the flicker reduction image obtained in this way by reflecting the exposure correction is called a flicker reduction image with exposure correction. An image at a first position in FIG. 5 is obtained. Then, the system control circuit 50 displays this flicker reduction image with exposure correction on the image display unit 28 as the through image (step S209).

At the second image pickup timing, the system control circuit 50 picks up a flicker reduction image with the image pickup device 14 without performing exposure correction (step S210), and stores the obtained flicker reduction image into the memory 30. Hereinafter, the flicker reduction image without performing exposure correction (the exposure correction is not reflected) is called a flicker reduction image without exposure correction. An image at a second position in FIG. 5 is obtained.

Subsequently, at a third image pickup timing, the system control circuit 50 picks up a flicker reduction image again with the image pickup device 14 while performing exposure correction (step S211). An image at a third position in FIG. 5 is obtained here. Then, the system control circuit 50 displays this flicker reduction image with exposure correction on the image display unit 28 as the through image (step S212).

At a fourth image pickup timing, the system control circuit 50 picks up a flicker emphasis image (i.e., flicker emphasis image without exposure correction) with the image pickup device 14 without performing exposure correction (step S213). An image at a fourth position in FIG. 5 is obtained here. The flicker reduction image without exposure correction and the flicker emphasis image without exposure correction are not displayed as through images. Then, the system control circuit 50 applies the differentiation process to the flicker reduction image without exposure correction and the flicker emphasis image without exposure correction that are stored in the memory 30, and extracts a flicker component (step S214). The system control circuit 50 detects the presence of a flicker and its cycle on the basis of the extracted flicker component, and makes them the flicker detection result. After that, the system control circuits 50 proceeds with the process to the step S207.

When the exposure correction will be set up in the future, images at fifth through eighth positions in FIG. 5 will be picked up in the order similarly. That is, in a period while performing the exposure correction, frequency of picking up a flicker reduction image with exposure correction is higher than frequency of picking up a flicker reduction image without exposure correction, and frequency of picking up a flicker emphasis image without exposure correction. Moreover, frequency of updating the through image is higher than the frequency of picking up a flicker reduction image without exposure correction, and the frequency of picking up a flicker emphasis image without exposure correction.

In the above-mentioned description, the flicker detection control is changed on the basis of whether the exposure correction is set up. Furthermore, the flicker detection control may be changed when the exposure correcting amount is more than a predetermined threshold. In this case, the exposure correcting amount that is the threshold for determining the change of the flicker detection control may be designated by a user or may be recorded as a setting value of the camera beforehand. That is, it may be determined whether the exposure correcting amount that is set up or the exposure correcting amount that the user manually sets up is more than the predetermined threshold, as the determination method in the S202 mentioned above. Then, when it is determined that the amount is more than the predetermined threshold, the process proceeds to the S208. As mentioned above, when the image pickup condition is changed from the predetermined condition, the flicker detection control shall be changed. And the predetermined condition is that the exposure correction is not set up, or that the exposure correcting amount falls within the predetermined range, etc.

Furthermore, even if the exposure correcting amount is less than the predetermined threshold, when the amplitude and reliability of the flicker component that is obtained in the step S206 become respectively smaller than predetermined values, the process may proceed to the step S208. This prevents an erroneous detection of the flicker during the flicker detection control.

Moreover, although the flicker detection control or the flicker detection process in the case where the exposure correction is performed was described in the above-mentioned example. On the other hand, when another image pickup condition, such as a tone curve setting or a digital zoom setting, is changed, the similar process is performed.

For example, when magnification more than one is set up in the digital zoom setting, an image within an area restricted according to the magnification of the digital zoom in the image pickup area of the image pickup device 14 is read, and the read image is expanded and displayed as the through image. In this case, when a flicker reduction image and a flicker emphasis image are obtained while restricting the reading area and a flicker component is extracted by applying the differentiation process to these images, it may become difficult to detect the presence and cycle of the flicker with sufficient accuracy because the area from which the flicker component is extracted is narrow. Accordingly, when the magnification more than one is set up in the digital zoom setting, the flicker reduction image obtained by restricting the reading area is displayed as the through image, and the differentiation process is applied to the flicker reduction image and flicker emphasis image that were obtained without restricting the area to extract a flicker component. In the case of the digital zoom setting, the flicker detection control may be changed when the magnification more than a predetermined threshold is set up as with the case of the exposure correction.

Thus, in the first embodiment of the present invention, when the setting of the image pickup condition like the exposure correction is changed, the images for the flicker detection are picked up according to the image pickup condition before the change besides the through image. Then, the flicker is detected on the basis of the image concerned for the flicker detection. As a result, the accuracy of the flicker detection at the time of displaying the through image is improved.

Subsequently, one example of a camera according to a second embodiment of the present invention will be described. It should be noted that the configuration of the camera according to the second embodiment is the same as the camera shown in FIG. 3.

Figure 6:
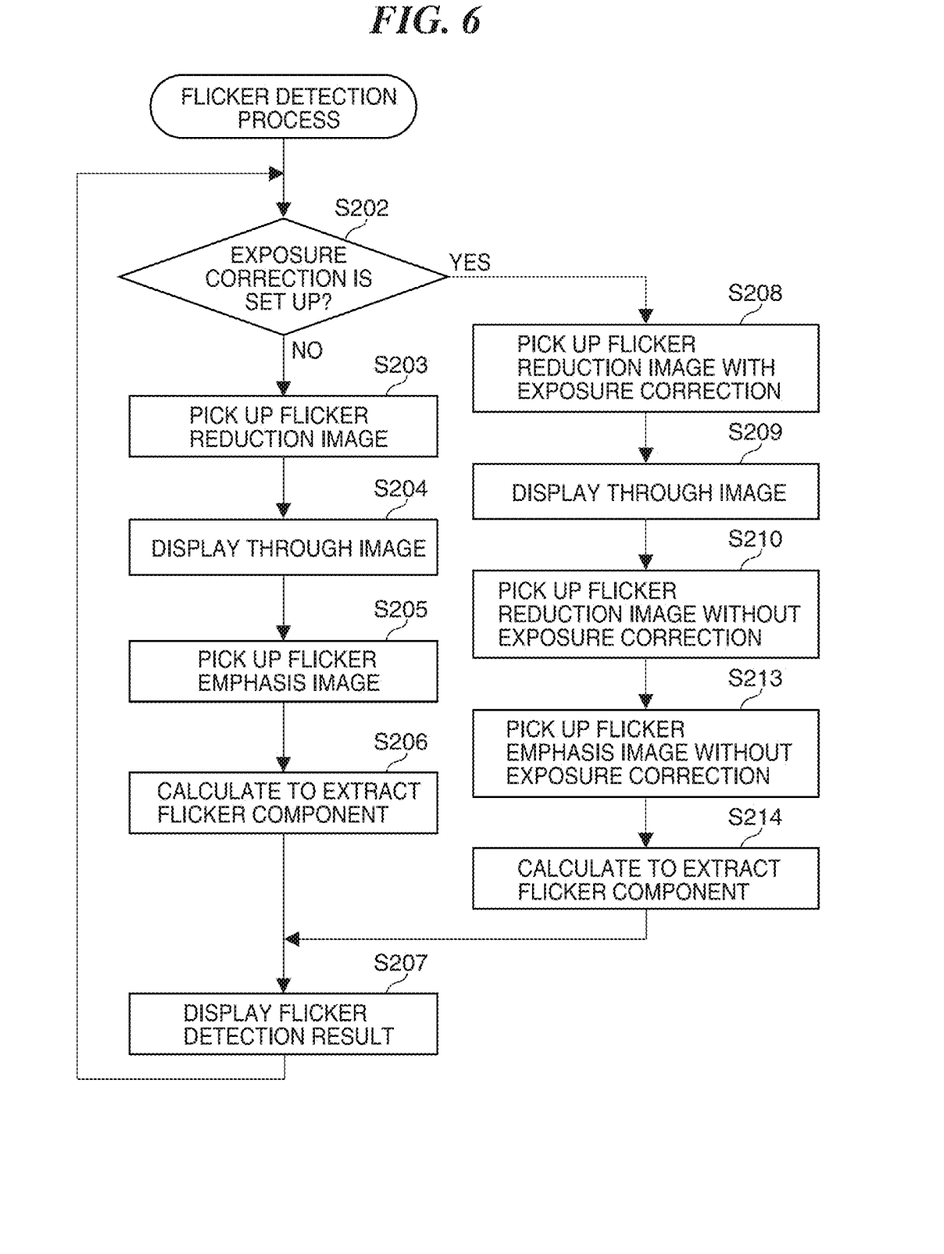
FIG. 6 is a flowchart showing a flicker detection process performed by a camera according to a second embodiment of the present invention.

FIG. 6 is a flowchart showing a flicker detection process performed by the camera according to the second embodiment of the present invention. It should be noted that the same reference numerals are assigned to the steps in FIG. 6 that are identical to the steps in the flowchart in FIG. 4. The flowchart in FIG. 6 is constituted by deleting the steps S211 and S212 of the flowchart in FIG. 4.

Figure 7:
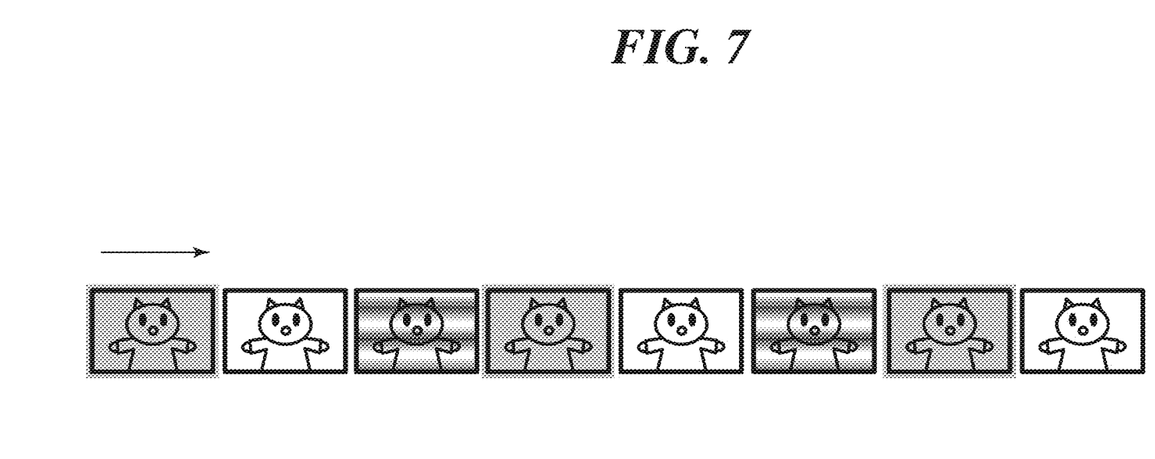
FIG. 7 is a view showing example of a series of images picked up when it is determined that the exposure correction was set up in step S202 in FIG. 6.

FIG. 7 is a view showing examples of a series of images picked up when it is determined that the exposure correction was set up in the step S202 in FIG. 6. It should be noted that the images shall be picked up in the order shown by a solid line arrow in FIG. 7.

The process will be described with also reference to FIG. 7. When the exposure correction was set up (YES in the step S202), the system control circuit 50 proceeds with the process to the step S208, and picks up a flicker reduction image with exposure correction with the image pickup device 14 at a first image pickup timing. An image at a first position in FIG. 7 is obtained here.

The system control circuit 50 performs the above-mentioned process in the steps S209 and S210 after the process in the step S208. It should be noted that the system control circuit 50 picks up a flicker reduction image without exposure correction with the image pickup device 14 in the step S210 at a second image pickup timing. An image at a second position in FIG. 7 is obtained here.

After that, the system control circuit 50 proceeds with the process to the step S213, and picks up a flicker emphasis image without exposure correction with the image pickup device 14 at a third image pickup timing. An image at a third position in FIG. 7 is obtained here. Then, the system control circuit 50 performs the process in the step S214, and proceeds with the process to the step S207.

When the exposure correction will be set up in the future, images at fourth through eighth positions in FIG. 7 will be picked up in the order similarly. That is, in a period while performing the exposure correction, frequency of picking up a flicker reduction image with exposure correction is equal to frequency of picking up a flicker reduction image without exposure correction, and frequency of picking up a flicker emphasis image without exposure correction.

Thus, in the second embodiment of the present invention, the flicker reduction image with exposure correction is picked up once before the flicker detection in the step S214. Accordingly, although frequency of updating the displayed through image is lowered, the second embodiment has an effect of shortening the time period required for the flicker detection in addition to the effects of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the functions of the above-mentioned embodiments may be achieved as a control method that is executed by the image pickup apparatus. Moreover, the functions of the above-mentioned embodiments may be achieved as a control program that is executed by a computer of the image processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-128604, filed Jun. 29, 2016, which is hereby incorporated by reference herein in its entirety.

What is claimed is:

1. An image pickup apparatus comprising:
an image pickup device;
a display that displays an image obtained by picking up with the image pickup device as a through image; and
at least one processor configured to execute a program stored in at least one non-transitory memory so as to function as units comprising:
a control unit configured to pick up a first image with the image pickup device according to an image pickup condition changed when the image pickup condition is changed from a predetermined condition while displaying the through image, to pick up a second image with the image pickup device within a first accumulation period without reflecting the image pickup condition changed, and to pick up a third image with the image pickup device within a second accumulation period shorter than the first accumulation period without reflecting the image pickup condition changed;

a display control unit configured to display the first image on the display as the through image; and a detection unit configured to detect a flicker, wherein the detection unit detects the flicker based on the second image and the third image in a case where the image pickup condition is changed from the predetermined condition while displaying the through image, and wherein the second image and the third image are not displayed as the through image on the display.

2. The image pickup apparatus according to claim 1, wherein the second accumulation period is shorter than 1/120 second.

3. The image pickup apparatus according to claim 1, wherein the image pickup condition is a setting of exposure correction.

4. The image pickup apparatus according to claim 1, wherein the image pickup condition is a setting of magnification of digital zoom.

5. The image pickup apparatus according to claim 1, wherein the control unit controls so that frequency of picking up the first image in a period while the image pickup condition is changed from the predetermined condition is more than frequency of picking up the second image and frequency of picking up the third image.

6. The image pickup apparatus according to claim 5, wherein the display control unit controls so that frequency of updating the through image displayed on the display is more than the frequency of picking up the second image and the frequency of picking up the third image.

7. The image pickup apparatus according to claim 1, wherein the control unit controls so that frequency of picking up the first image in a period while the image pickup condition is changed from the predetermined condition is equal to a frequency of picking up the second image and a frequency of picking up the third image.

8. A control method for an image pickup apparatus, the control method comprising:

displaying an image obtained by picking up with an image pickup device as a through image on a display;

picking up a first image with the image pickup device according to an image pickup condition changed when the image pickup condition is changed from a predetermined condition while displaying the through image;

picking up a second image with the image pickup device within a first accumulation period without reflecting the image pickup condition changed;

picking up a third image with the image pickup device within a second accumulation period shorter than the first accumulation period without reflecting the image pickup condition changed;

displaying the first image on the display as the through image; and detecting a flicker, wherein the flicker is detected based on the second image and the third image in a case where the image pickup condition is changed from the predetermined condition while displaying the through image, and wherein the second image and the third image are not displayed as the through image on the display.

9. A non-transitory computer-readable storage medium storing a control program causing a computer to execute a control method for an image pickup apparatus, the control method comprising:

displaying an image obtained by picking up with an image pickup device as a through image on a display;

picking up a first image with the image pickup device according to an image pickup condition changed when the image pickup condition is changed from a predetermined condition while displaying the through image;

picking up a second image with the image pickup device within a first accumulation period without reflecting the image pickup condition changed;

picking up a third image with the image pickup device within a second accumulation period shorter than the first accumulation period without reflecting the image pickup condition changed;

displaying the first image on the display as the through image; and detecting a flicker, wherein the flicker is detected based on the second image and the third image in a case where the image pickup condition is changed from the predetermined condition while displaying the through image, and wherein the second image and the third image are not displayed as the through image on the display.

10. The image pickup apparatus according to claim 1, wherein, in a case where the image pickup condition is not changed from the predetermined condition while displaying the through image, the control unit controls so that the first image and the third image are image pickup with the same image pickup condition each other, and wherein the detection unit detects the flicker based on the first image and the third image in a case where the image pickup condition is not changed from the predetermined condition while displaying the through image.

11. The image pickup apparatus according to claim 1, wherein the detection unit detects a presence of the flicker and a cycle of the flicker.

* * * * *